United States Patent [19]

Matsukura et al.

[11] Patent Number: 5,942,570

[45] Date of Patent: *Aug. 24, 1999

[54] WATER-BASED PAINT COMPOSITION

[75] Inventors: Yoshiaki Matsukura, Yokahama; Atsuhiro Sakai, Ebina, both of Japan; Hitoshi Taniguchi, West Bloomfield, Mich.; Yoshiaki Kawamura, Kamakura, Japan

[73] Assignee: BASF Coatings AG, Muenster-Hiltrup, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/875,029

[22] PCT Filed: Jan. 11, 1996

[86] PCT No.: PCT/EP96/00107

§ 371 Date: Sep. 11, 1997

§ 102(e) Date: Sep. 11, 1997

[87] PCT Pub. No.: WO96/22339

PCT Pub. Date: Jul. 25, 1996

[30] Foreign Application Priority Data

Jan. 20, 1995 [JP] Japan ................... 7-007692

[51] Int. Cl.⁶ .................................................. C08L 33/00
[52] U.S. Cl. ............................................................. 524/522
[58] Field of Search ............................................. 524/522

[56] References Cited

U.S. PATENT DOCUMENTS

| 3,821,145 | 6/1974 | Walus | 260/29.4 |
| 4,255,308 | 3/1981 | Brasen | 524/522 |
| 4,329,266 | 5/1982 | Suzuki | 524/504 |
| 4,465,803 | 8/1984 | Nakayama | 524/460 |
| 4,861,818 | 8/1989 | Timmerman | 524/460 |
| 5,219,916 | 6/1993 | Hartog | 524/515 |
| 5,308,890 | 5/1994 | Snyder | 523/201 |
| 5,516,834 | 5/1996 | Mori | 524/504 |

FOREIGN PATENT DOCUMENTS

| 0 292 004 | 5/1988 | European Pat. Off. | C09D 3/81 |
| 2 060 654 A3 | 9/1980 | United Kingdom | C08F 265/00 |

*Primary Examiner*—Paul R. Michl

[57] ABSTRACT

A water-based paint composition comprising (A) from 10–90% by weight, based on total weight of resin solids of a water-dispersible acrylic graft copolymer having an acid value of 10–30 mg and a hydroxyl value of 50–150, wherein the polymer is obtained by graft polymerization of an acrylic copolymer of an acid value of 35–120 mg KOH/g and a hydroxyl value 50–150 mg KOH/g, and an acrylic copolymer of acid value $\leq 15$ and a hydroxyl value of 50–150, and (B) from 10–90% by weight, based on total weight of resin solids of internally non-crosslinked acrylic fine particles having an acid value 15–200 and a hydroxyl value of 15–200 made by emulsion polymerizing $\alpha,\beta$-ethylenically unsaturated monomers.

4 Claims, No Drawings

WATER-BASED PAINT COMPOSITION

The present invention relates to a water-based paint composition which contains a water-dispersible acrylic graft copolymer and internally non-crosslinked acrylic fine particles, and especially to a water-based paint composition suited to metallic paint for automobiles.

As the problem of pollution of the global environment has deepened in recent years, international regulations regarding the discharge of organic solvents have become more and more stringent. Against this background water-based paint using water as a medium has stepped into the spotlight. In this context, the development of water-based metallic undercoats for industrial painting and especially automobile painting has been regarded as advantageous, not only because it has the effect of decreasing the use of organic solvents but also from the point of view of finished appearance and cost-performance, and to date various water-based undercoats have been developed.

When one looks at the history of the art of making water-based undercoats, the trend has been to adopt water-dispersible resins as base resins. This is because water-based paints in the form of an aqueous dispersion have the advantage of giving the water-based undercoat the rheological properties it requires.

Water-based paints in the form of aqueous dispersions are characterized in that the basic resin is present in the water as particles. These can be classified broadly into direct emulsions or indirect emulsions according to the method for preparing the basic emulsion. In the direct emulsion method particles are formed directly in water by emulsion polymerization or suspension polymerization; in the indirect emulsion method the base resin is first prepared in a solvent phase and then transferred to an aqueous phase.

Of these the direct emulsion method is very much more efficacious in eliminating solvents from water-based paint since no organic solvent is needed at the preparation stage, and the preparation of the base resin is also easy. However, because of the limitations imposed by preparing the base resin in water, it has the problems that the suitability of the starting materials employed for polymerization has a considerable effect, and scope for resin design is narrowed.

On the other hand, with the indirect emulsion method there is a large degree of freedom as to the starting materials which can be employed and wide scope for resin design, but on the other hand there are problems in that it is difficult to remove the organic solvent employed when preparing the base resin, and this hinders the production of low-solvent water-based undercoats.

In this connection, water-based paints using polymer fine particles obtained by emulsion polymerization are recorded in EP00387 A1 and EP0401565 A1.

However, although such water-based paints do not give rise to painting faults such as sagging or bittiness, etc., since the particles confer pseudoplastic or thixotropic properties, there is the problem that the viscosity of the paint is prone to rise after application to the object to be painted and rheological properties become inadequate, and consequently smoothness is inferior. They also have the problem that dispersibility of pigments is inferior and it is difficult to obtain paint films with an outstanding gloss. Moreover, because the emulsifier is present in the aqueous dispersion after obtaining the resin by emulsion polymerization, inferior water-resistance is a problem.

In Japanese Examined Patent HS-30867 a water-based paint composition is recorded which contains water-insoluble vinyl resin fine particles of mean particle size 0.3–6 μm obtained by polymerizing at least one type of water-soluble resin selected from polyester resins, alkyd resins, vinyl resins, vinyl-modified polyester resins and vinyl-modified alkyd resins, with a polymerizable unsaturated monomer in water by two-stage emulsion polymerization in the presence of a seeded emulsion.

However, this water-based paint composition has the problem that because it is formed by dispersing a water-insoluble resin storage stability is inferior because it is prone to flocculate.

The purpose of the present invention is to offer a water-based paint composition which combines the features both of aqueous dispersion type water-based paints obtained by direct emulsification and of aqueous dispersion type water-based paints obtained by indirect emulsification: namely, enabling broad scope for design of the base resin and low-solvent use, not producing blistering, sagging or bittiness, etc., offering outstanding ease of application and storage stability, and also enabling formation of paint films with outstanding water-resistance, durability and smoothness.

A 2nd purpose of the present invention is to offer a water-based paint composition suitable as a metallic paint, which confers pseudoplastic and thixotropic properties even when a large quantity of pigment is dispersed therein, does not produce blistering, sagging or bittiness, etc., offers outstanding ease of application, and also enables the formation of paint films with outstanding water-resistance, durability and smoothness, and has outstanding storage stability.

The present invention is the following water-based paint compositions.

(1) A water-based paint composition characterized in that it contains
a water-dispersable acrylic graft copolymer (A) which is a graft copolymer of an acrylic copolymer (a1) which is a copolymer of $\alpha,\beta$-ethylenic unsaturated monomers including an $\alpha,\beta$-ethylenic unsaturated carboxylic acid and has an acid value of 35–120 mg KOH/g and a hydroxyl value of 50–150 mg KOH/g, and an acrylic copolymer (a2) which is a copolymer of $\alpha,\beta$-ethylenic unsaturated monomers and has an acid value of $\leq 15$ mg KOH/g and a hydroxyl value of 50–150 mg KOH/g, grafted via chemical bonds, which has an acid value of 10–30 mg KOH/g and a hydroxyl value of 50–150 mg KOH/g, and
internally non-crosslinked acrylic fine particles (B) which are of a copolymer made by emulsion polymerization of $\alpha,\beta$-ethylenic unsaturated monomers (b1) and have an acid value of 15–200 mg KOH/g and a hydroxyl value of 15–200 mg KOH/g,
with the proportions within the total resin solids in the water-based paint composition which each accounts for being 10–90 wt % for the water-dispersible acrylic graft copolymer (A), and 10–90 wt % for the internally non-crosslinked acrylic fine particles (B).

(2) A water-based paint composition recorded in (1) above, characterized in that it contains an amino resin (C) of a number-average molecular weight of $\leq 1000$, accounting for a proportion of 10–40 wt % of the total resin solids in the water-based paint composition.

(3) A water-based paint composition recorded in (1) or (2) above, characterized in that it contains an organic thickener swelled by alkalis (D) at 0.1–5 wt % of the total resin solids in the water-based paint composition.

(4) A water-based paint composition recorded in any of (1)–(3) above, characterized in that the glass transition temperature of the acrylic copolymer (a1) is −20 to +50° C. and its number average molecular weight is 4500–9000, the glass transition temperature of the water-dispersible acrylic graft copolymer (A) is −20 to +50° C. and its number average molecular weight is 10,000 to 100,000, and that the mean particle size of the internally non-crosslinked acrylic fine particles (B) in an aqueous medium is 20–150 nm.

In the present invention the expressions "(meth)acrylic acid" and "(meth)acrylate" indicate "acrylic acid and/or methacrylic acid" and "acrylate and/or methacrylate".

The acrylic graft copolymer (A) used in the present invention is a graft copolymer in which the main chain is a hydrophilic acrylic copolymer (a1), which is hydrated and becomes a stabilizing layer when dispersed in an aqueous medium, and a hydrophobic acrylic acid copolymer (a2), which becomes a dispersion layer on dispersion, is grafted to this as side chains via chemical bonds.

The acid value of this acrylic graft copolymer (A) is 10–30 mg KOH/g, and preferably 15–30 mg KOH/g, and its hydroxyl value is 50–150 mg KOH/g, and preferably 50–120 mg KOH/g. It is also desirable that the glass transition temperature is −20 to +50° C., and preferably −10 to +30° C., and that the number average molecular weight is 10,000–100,000, and preferably 10,000–50,000.

The acrylic copolymer (a1) which constitutes the main chain of the acrylic graft copolymer (A) is a copolymer of $\alpha,\beta$-ethylenic unsaturated monomers including an $\alpha,\beta$-ethylenic unsaturated carboxylic acid, and has an acid value of 35–120 mg KOH/g, and preferably 60–110 mg KOH/g, and a hydroxyl value of 50–150 mg KOH/g, and preferably 60–150 mg KOH/g. It is also desirable that the acrylic copolymer (a1) has a glass transition temperature of −20 to +50° C., and preferably −20 to +30° C., and a number average molecular weight of 4500–9000, and preferably 4800–7000.

The acrylic copolymer (a2) which constitutes the side chains of the acrylic graft copolymer (A) is also a copolymer of $\alpha,\beta$-ethylenic unsaturated monomers, and has an acid value of $\leq 15$ mg KOH/g, and preferably $\leq 10$ mg KOH/g, and a hydroxyl value of 50–150 mg KOH/g, and preferably 50–120 mg KOH/g.

The acrylic graft copolymer (A) employed in the present invention has a structure in which an acrylic copolymer (a1) and an acrylic copolymer (a2) as described above are graft copolymerized via chemical bonds such as ester linkages, ether linkages or urethane linkages, etc.

The acrylic graft copolymer (A) employed in the present invention is employed as the base resin which becomes the film-forming constituent; any polymer which has the aforementioned constitution and property values can be employed, with no specific restriction as to the method for making it. For example, an acrylic graft copolymer (A-1) in which an acrylic copolymer (a2-1) from a monomer combination (mm-1) including an $\alpha,\beta$-unsaturated monomer containing a glycidyl group (m-3) and an $\alpha,\beta$-unsaturated monomer containing a hydroxyl group (m-4) is graft polymerized to an acrylic copolymer (a1-1) from an $\alpha,\beta$-ethylenic unsaturated monomer containing a hydroxyl group (m-1) and an $\alpha,\beta$-ethylenic unsaturated monomer containing a carboxyl group (m-2), or an acrylic graft copolymer (A-2) in which an acrylic copolymer (a2-2) from a monomer combination (mm-2) including copolymerizable unsaturated monomers (m-6) is graft polymerized to an acrylic copolymer (a1-2) containing unsaturated bonds, obtained by reacting the acrylic copolymer (a1-1) above with an $\alpha,\beta$-ethylenic unsaturated monomer (m-5) containing a functional group which can react with carboxyl groups and/or hydroxyl groups, can be employed as the acrylic graft copolymer (A).

Water-dispersible acrylic graft copolymers (A-1) which can be employed as a preferred Component (A) will first be explained. In acrylic graft copolymers of (A-1), an $\alpha,\beta$-ethylenic unsaturated monomer (m-1) containing a hydroxyl group and an $\alpha,\beta$-ethylenic unsaturated monomer (m-2) containing a carboxyl group are essential components of the hydrophilic acrylic copolymer (a1) which becomes the stabilizing layer; and the acrylic graft copolymer (a1-1) can be made from these $\alpha,\beta$-ethylenic unsaturated monomers and any other optionally used copolymerizable unsaturated monomer(s) (m-7) by a known solution polymerization method in the presence of a suitable polymerization initiator.

Examples of $\alpha,\beta$-ethylenic unsaturated monomers (m-1) containing a hydroxyl group include hydroxyalkyl esters of (meth)acrylic acid, such as 2-hydroxyethyl (meth)acrylate, 2-hydroxypropyl (meth)acrylate and 3-hydroxypropyl (meth)acrylate, etc., polyether polyols such as polyethylene glycol and polypropylene glycol, etc., monoethers of $\alpha,\beta$-unsaturated monomers containing a hydroxyl group such as 2-hydroxyethyl (meth)acrylate, etc., and lactone-modified $\alpha,\beta$-ethylenic unsaturated monomers such as addition compounds of hydroxyalkyl esters of (meth)acrylic acid with 1–10 mols of a lactone such as $\epsilon$-caprolactone or $\gamma$-caprolactone, etc. These can be employed singly or in combinations of 2 or more.

Examples of $\alpha,\beta$-ethylenic unsaturated monomers (m-2) containing a carboxyl group include acrylic acid, methacrylic acid, crotonic acid, itaconic acid and maleic acid, etc. These can be employed singly or in combinations of 2 or more.

Other optionally used copolymerizable unsaturated monomers (m-7) include: esters, for example $C_{1-18}$ alkyl esters of (meth)acrylic acid, such as methyl (meth)acrylate, ethyl (meth)acrylate, propyl (meth)acrylate, isopropyl (meth)acrylate, butyl (meth)acrylate, hexyl (meth)acrylate, octyl (meth)acrylate and lauryl (meth)acrylate, etc.; alkoxyalkyl esters of (meth)acrylic acid, such as methoxybutyl acrylate, methoxyethyl (meth)acrylate and ethoxybutyl (meth)acrylate, etc.; amides of acrylic acid and methacrylic acid; (meth)acrylic acid amides such as N-methylol(meth)acrylamide and N-isobutoxymethylol(meth)acrylamide, etc.; and aromatic vinyl compounds such as styrene, $\alpha$-methylstyrene and vinyltoluene, etc.

The acrylic copolymers (a1-1) can be obtained by solution polymerization according to an ordinary method using these monomers, in the presence of a known polymerization initiator, such as azobisisobutyronitrile, benzoyl peroxide, t-butyl peroxybenzoate, t-butyl peroxide or t-butylperoxy-2-ethylhexanoate, etc. This reaction is performed such that the acrylic copolymer (a1-1) produced has an acid value of 35–120 mg KOH/g, and preferably 50–110 mg KOH/g and a hydroxyl value of 50–150 mg KOH/g, and preferably 60–150 mg KOH/g. It is also desirable that the reaction is performed to give a glass transition temperature of −20 to +50° C., and preferably −20 to +30° C., and a number average molecular weight of 4500–9000, and preferably 4800–7000. As the reaction medium, toluene, methyl isopropyl ketone, ethylene glycol monoethyl ether, ethylene glycol monobutyl ether, propylene glycol monopropyl ether or propylene glycol monoethyl ether, etc., or a mixture of these, etc., can be employed.

When the acid value of the acrylic copolymer (a1-1) is less than 35 mg KOH/g its action as a stabilizing layer is inadequate and the resulting acrylic graft copolymers (A-1) become prone to flocculate in an aqueous medium so that storage stability is inferior; and when it exceeds 120 mg KOH/g it becomes too hydrophilic and paint films formed from water-based paint compositions prepared from the resulting acrylic graft copolymers (A-1) are inferior in water-resistance.

When the hydroxyl value of the acrylic copolymer (a1-1) is less than 50 mg KOH/g there are insufficient points for crosslinking between the resulting acrylic graft copolymers (A-1) and the amino resin (C) used as a curing agent, and consequently paint films obtained are inferior in resistance to chemicals; and when it exceeds 150 mg KOH/g the resulting acrylic graft copolymers (A-1) become excessively hydrophilic, and paint films formed from water-based paint compositions containing them are inferior in water-resistance.

Similarly, when the glass transition temperature of the acrylic copolymer (a1-1) is less than −20° C. the resulting acrylic graft copolymers (A-1) are prone to conglutinate in aqueous media, so that the storage stability of aqueous dispersions is inferior; and when the glass transition temperature exceeds +50° C. the resulting acrylic graft copolymers (A-1) have a high softening point, and the smoothness of paint films from water-based paint compositions prepared from these is inferior.

When the number average molecular weight of the acrylic copolymer (a1-1) is less than 4500 it cannot form an adequate stabilizing layer and the storage stability of aqueous dispersions of resulting acrylic graft copolymers (A-1) is inferior; and when it exceeds 9000 aqueous dispersions of the resulting graft copolymers (A-1) become highly viscous, the proportion of painted solids of water-based paint compositions prepared from these is lowered and they are inferior as regards sagging.

The acrylic graft copolymer (A-1) is obtained by reacting a monomer combination (mm-1) with the acrylic copolymer (a1-1) above. As the monomer combination (mm-1) a monomer combination is employed in which the essential components are an α,β-ethylenic unsaturated monomer (m-3) containing a glycidyl group and an α,β-ethylenic unsaturated monomer (m-4) containing a hydroxyl group, combined if necessary with (an)other copolymerizable unsaturated monomer(s) (m-7), to give an acid value of $\leq 15$ mg KOH/g, and preferably $\leq 10$ mg KOH/g, and a hydroxyl value of 50–150 mg KOH/g and preferably 50–120 mg KOH/g.

Examples of α,β-ethylenic unsaturated monomers (m-3) containing a glycidyl group include glycidyl (meth)acrylate and allyl glycidyl ether, etc. Examples of α,β-ethylenic unsaturated monomers containing a hydroxyl group (m-4) and of other copolymerizable unsaturated monomers (m-7) have been cited in connection with the aforementioned acrylic copolymer (a1-1).

When the acid value of the monomer combination (mm-1) above exceeds 15 mg KOH/g the resulting acrylic graft copolymers (A-1) become highly viscous, the proportion of painted solids of water-based paint compositions prepared from these is lowered and they are inferior as regards sagging.

When the hydroxyl value of the monomer combination (mm-1) is less than 50 mg KOH/g there are insufficient points for crosslinking between the resulting acrylic graft copolymers (A-1) and the amino resin (C) used as a curing agent, and consequently paint films obtained are inferior in resistance to chemicals; and when it exceeds 150 mg KOH/g the resulting acrylic graft copolymers (A-1) become excessively hydrophilic, and the resulting paint films are inferior in water-resistance.

The reaction between the aforementioned acrylic copolymer (a1-1) and monomer combination (mm-1) is performed with a ratio of acrylic copolymer (a1-1) and monomer combination (mm-1), (a1-1)/(mm-1) (w/w) of 10/90 to 60/40, and preferably 20/80 to 40/60, and (m-3)/(a1-1) (mol/mol) 0.4–1.5, and preferably 0.8–1.2.

The number of mols of acrylic copolymer (a1-1) can be decided by calculation from the number average molecular weight (polystyrene basis) determined in the ordinary way by gel permeation chromatography.

When (a1-1)/(mm-1) (w/w) is less than 10/90 an adequate stabilizing layer is not formed, and aqueous dispersions of the resulting acrylic graft copolymers (A-1) have inferior storage stability; and when it exceeds 60/40 aqueous dispersions of the resulting acrylic graft copolymers (A-1) become very highly viscous, the proportion of painted solids of water-based paint compositions prepared from these acrylic graft copolymers (A-1) is lowered and they are inferior as regards sagging.

Similarly, when the molar ratio of the quantity of α,β-ethylenic unsaturated monomer (m-3) containing a glycidyl group in the combination relative to the acrylic copolymer (a1-1) is less than 0.4, the grafting reaction with the monomer combination (mm-1) becomes inadequate, and either dispersion of the resulting acrylic graft copolymer (A-1) in an aqueous medium becomes difficult, or the storage stability of the resulting water-based paint composition is inferior; and when it exceeds 1.5 gelling occurs and it is impossible to make an acrylic graft copolymer (A-1).

The reaction between the acrylic copolymer (a1-1) and the monomer combination (mm-1) can be performed by [graft copolymerizing] the acrylic graft copolymer (a1-1) and the monomer combination (mm-1) by a known solution polymerization method in an organic solvent. Thus, it can be performed by a known solution polymerization method in an organic solvent as a continuation of the preparation of the acrylic copolymer (a1-1) by adding the monomer combination to the reaction liquor after making the acrylic copolymer (a1-1).

As the organic solvent, toluene, methyl isopropyl ketone, ethylene glycol monoethyl ether, ethylene glycol monobutyl ether, propylene glycol monopropyl ether or propylene glycol monoethyl ether, etc., or a mixture of these, etc., can be employed.

As the polymerization initiator for copolymerizing the monomer combination (mm-1) the same polymerization initiators given as examples in the making of the acrylic copolymer (a1-1) can be employed.

It is desirable that the combined concentration of acrylic copolymer (a1-1) and monomer combination (mm-1) in the reaction solution is 30–90 wt %, and preferably 50–80 wt %, and that the concentration of the polymerization initiator is 0.1–10 wt %, and preferably 0.5–5 wt %. It is also desirable that the reaction temperature is 20–180° C., and preferably 40–160° C., and that the reaction time is 1–10 hours.

The acid value, hydroxyl value, glass transition temperature and number average molecular weight of the resulting acrylic graft copolymer (A-1) can be adjusted by selecting the reaction conditions such as the types of acrylic copolymer (a1-1) and monomer combination (mm-1) employed and the quantities employed, the reaction temperature, the reaction time and the type and quantity of polymerization initiator employed.

In the reaction above graft polymerization is performed by ring opening addition which proceeds between the carboxyl groups of the acrylic copolymer (a1-1) and the glycidyl groups of the component (m-3) which contains a glycidyl group, and accompanying free radical polymerization of the different monomers (m-3), (m-4) and (m-7), to make an acrylic graft copolymer (A-1) in a single-stage reaction.

The acrylic graft copolymer (A-1) is a graft copolymer which can be made as described above, and is a water-dispersible acrylic graft copolymer which has an acid value of 10–30 mg KOH/g, and preferably 15–30 mg KOH/g, and a hydroxyl value of 50–150 mg KOH/g, and preferably 50–120 mg KOH/g. It is also desirable that this acrylic graft copolymer (A-1) has a glass transition temperature of −20 to +50° C., and preferably −10 to +30° C., and a number average molecular weight of 10,000–100,000 and preferably 10,000–50,000.

When the acid value of the acrylic graft copolymer (A-1) is less than 10 mg KOH/g it becomes difficult to disperse in an aqueous medium, or storage stability is inferior; and when it exceeds 30 mg KOH/g the resulting aqueous dispersions become very highly viscous, the proportion of painted solids of water-based paint compositions prepared from these is lowered and they are inferior as regards sagging.

When the hydroxyl value of the acrylic graft copolymer (A-1) is less than 50 mg KOH/g there are insufficient points for crosslinking between the resulting acrylic graft copolymers (A-1) and the amino resin (C) used as a curing agent, and consequently paint films obtained are inferior in resistance to chemicals; and when it exceeds 150 mg KOH/g it becomes excessively hydrophilic and the paint films obtained are inferior in water-resistance.

Similarly, when the glass transition temperature of the acrylic graft copolymer (A-1) is less than −20° C. the graft copolymer (A-1) is prone to conglutinate in aqueous media, so that the storage stability of aqueous dispersions is inferior; and when the glass transition temperature exceeds +50° C. the smoothness of paint films from water-based paint compositions containing this acrylic graft copolymer (A-1) is inferior.

When the number average molecular weight of the acrylic graft copolymer (A-1) is less than 10,000 paint films formed from water-based paint compositions prepared from this acrylic graft copolymer (A-1) are inferior in resistance to chemicals; and when it exceeds 100,000 there is a risk that gelling will occur when making the acrylic graft copolymer.

Aforementioned acrylic graft copolymers (A-2) which can be employed as preferred components (A) will next be explained. Acrylic graft copolymers (A-2) are graft copolymers in which an acrylic copolymer (a1-2) containing unsaturated bonds, obtained by reacting an aforementioned acrylic copolymer (a1-1) with an α,β-ethylenic unsaturated monomer (m-5) having a functional group which can react with carboxyl groups and/or hydroxyl groups, and a monomer combination (mm-2) comprising copolymerizable unsaturated monomers (m-6), are graft polymerized.

As regards the α,β-ethylenic unsaturated monomers (m-5) above, concrete examples of α,β-ethylenic unsaturated monomers (m-5-1) which have a functional group which can react with hydroxyl groups include α,α-dimethylisopropenylbenzyl isocyanate and methacryloyl isocyanate, etc. Concrete examples of α,β-ethylenic unsaturated monomers (m-5-2) which have a functional group which can react with carboxyl groups include glycidyl (meth)acrylate and allyl glycidyl ether, etc.

The reaction between the acrylic copolymer (a1-1) and a monomer (m-5) above is performed with a molar ratio (m-5)/(a1-1) of 0.4–1.5, and preferably 0.8–1.2, such that the acrylic copolymer (a1-2) containing unsaturated bonds that is obtained has an acid value of 35–120 mg KOH/g, and preferably 50–150 mg KOH/g [sic], and a hydroxyl value of 50–150 mg KOH/g, and preferably 60–150 mg KOH/g. It is also desirable that the reaction is performed to give a glass transition temperature of −20 to +50° C., and preferably −20 to +30° C., and a number average molecular weight of 4500–9000, and preferably 4800–7000. The number of mols of acrylic copolymer (a1-1) can be decided by calculation from the number average molecular weight (polystyrene basis) determined in the ordinary way by gel permeation chromatography.

When the mol ratio above is less than 0.4 the grafting reaction with the monomer combination (mm-2) becomes inadequate, and either dispersion of the resulting acrylic graft copolymer (A-2) in an aqueous medium becomes difficult, or the storage stability of the resulting water-based paint composition is inferior; and when it exceeds 1.5 gelling occurs and it is impossible to make an acrylic graft copolymer (A-2).

When the acid value of the acrylic copolymer (a1-2) is less than 35 mg KOH/g its action as a stabilizing layer is inadequate and the resulting acrylic graft copolymers (A-2) become prone to flocculate in an aqueous medium so that storage stability is inferior; and when it exceeds 120 mg KOH/g it becomes too hydrophilic and paint films formed from water-based paint compositions prepared from the resulting acrylic graft copolymers (A-2) are inferior in water-resistance.

When the hydroxyl value of the acrylic copolymer (a1-2) is less than 50 mg KOH/g there are insufficient points for crosslinking between the resulting acrylic graft copolymers (A-2) and the amino resin (C) used as a curing agent, and consequently paint films obtained are inferior in resistance to chemicals; and when it exceeds 150 mg KOH/g the resulting acrylic graft copolymers (A-2) become excessively hydrophilic and paint films formed from water-based paint compositions containing them are inferior in water-resistance.

Similarly, when the glass transition temperature of the acrylic copolymer (a1-2) is less than −20° C. the acrylic graft copolymers (A-2) obtained are prone to conglutinate in aqueous media, so that the storage stability of aqueous dispersions is inferior; and when the glass transition temperature exceeds +50° C. the resulting acrylic graft copolymers (A-2) have a high softening point, and the smoothness of paint films from water-based paint compositions prepared from these is inferior.

When the number average molecular weight of the acrylic copolymer (a1-2) is less than 4500 it cannot form an adequate stabilizing layer and the storage stability of aqueous dispersions of resulting acrylic graft copolymers (A-2) is inferior; and when it exceeds 9000 aqueous dispersions of the resulting graft copolymers (A-2) become highly viscous, the proportion of painted solids of water-based paint compositions prepared from these is lowered and they are inferior as regards sagging.

The reaction of the acrylic copolymer (a1-1) and the monomer (m-5) is preferably performed in the presence of a catalyst such as dibutyltin diacetate, dibutyltin dilaurate or dibutyltin diacetonate, etc.

It is desirable that the combined concentration of component (a1-1) and component (m-5) in the reaction solution is 30–90 wt %, and preferably 50–80 wt %, and that the concentration of catalyst in the reaction liquid is 0.1–5 wt %, and preferably 0.1–2 wt %. It is also desirable that the reaction temperature is 20–120° C., and preferably 40–140° C., and the reaction time is 0.5–5 hours.

In the reaction above an acrylic copolymer (a1-2) containing unsaturated bonds is made by reaction between the hydroxyl groups of the acrylic copolymer (a1-1) and the functional group of component (m-5) which reacts with carboxyl groups or hydroxyl groups, for example an isocyanate group or a glycidyl group, to form chemical bonds by which component (m-5) is added to the acrylic copolymer (a1-1).

The acrylic graft copolymer (A-2) is obtained by graft copolymerizing to an acrylic copolymer (a1-2) containing unsaturated bonds above a monomer combination (mm-2) combining copolymerizable unsaturated monomers (m-6) to give an acid value of ≦15 mg KOH/g, and preferably ≦10 mg KOH/g, and a hydroxyl value of 50–150 mg KOH/g, and preferably 60–120 mg KOH/g.

The copolymerizable unsaturated monomers (m-6) can be selected from the α,β-ethylenic unsaturated monomers (m-1) containing a hydroxyl group, α,β-ethylenic monomers (m-2) containing a carboxyl group and other copolymerizable unsaturated monomers (m-7) given as examples in connection with the aforementioned acrylic copolymer (a1-1).

When the acid value of the monomer combination (mm-2) above exceeds 15 mg KOH/g the resulting acrylic graft copolymers (A-2) become highly viscous, the proportion of painted solids of water-based paint compositions prepared from these is lowered and they are inferior as regards sagging.

When the hydroxyl value of the monomer combination (mm-2) is less than 50 mg KOH/g there are insufficient points for crosslinking between the resulting acrylic graft copolymers (A-2) and the amino resin (C) used as a curing agent, and consequently paint films obtained are inferior in resistance to chemicals; and when it exceeds 150 mg KOH/g it becomes excessively hydrophilic, and the resulting paint films are inferior in water-resistance.

The reaction between the aforementioned acrylic copolymer (a1-2) containing unsaturated bonds and monomer combination (mm-2) is performed with a ratio of acrylic copolymer (a1-2) containing unsaturated bonds and monomer combination (mm-2), (a1-2)/(mm-2) (w/w) of 10/90 to 60/40, and preferably 20/80 to 40/60, and (m-3)/(a1-1) (mol/mol) 0.4–2.5, and preferably 0.8–2.2. When this weight ratio is less than 10/90 an adequate stabilizing layer is not formed, and aqueous dispersions of the resulting acrylic graft copolymers (A-2) have inferior storage stability; and when it exceeds 60/40 aqueous dispersions of the resulting acrylic graft copolymers (A-2) become very highly viscous, the proportion of painted solids of water-based paint compositions prepared from these acrylic graft copolymers (A-2) is lowered and they are inferior as regards sagging.

The reaction between the acrylic copolymer (a1-2) and the monomer combination (mm-2) can make component (a1-2) and the monomer combination (mm-2) by a known solution polymerization method in a suitable reaction media.

The graft polymerization reaction between component (a1-2) and component (mm-2) can be performed in the presence of a polymerization initiator by a known method. As the polymerization initiator the same polymerization initiators given as examples in the making of the acrylic copolymer (a1-1) can be employed.

It is desirable that the combined concentration of acrylic copolymer (a1-2) and monomer combination (mm-2) in the reaction solution is 30–90 wt %, and preferably 50–80 wt %, and that the concentration of the polymerization initiator is 0.1–10 wt %, and preferably 0.5–5 wt %, relative to the total weight. It is also desirable that the reaction temperature is 20–180° C., and preferably 40–160° C., and that the reaction time is 1–10 hours.

The acid value, hydroxyl value, glass transition temperature and number average molecular weight of the resulting acrylic graft copolymer (A-2) can be adjusted by selecting the reaction conditions such as the types of component (a1-2) and component (mm-2) employed and the quantities employed, the reaction temperature, the reaction time and the type and quantity of polymerization initiator employed.

In the reaction above graft polymerization is performed by copolymerization of the monomer combination (mm-2) with the unsaturated bonds in component (a1-2), to make the acrylic graft copolymer (A-2).

The acrylic graft copolymer (A-2) is a graft copolymer which can be made as described above, and is a water-dispersible acrylic graft copolymer which has an acid value of 10–30 mg KOH/g, and preferably 15–30 mg KOH/g, and a hydroxyl value of 50–150 mg KOH/g, and preferably 60–120 mg KOH/g. It is also desirable that this acrylic graft copolymer (A-2) has a glass transition temperature of −20 to +50° C., and preferably −10 to +30° C., and a number average molecular weight of 10,000–100,000 and preferably 10,000–50,000.

When the acid value of the acrylic graft copolymer (A-2) is less than 10 mg KOH/g it becomes difficult to disperse in an aqueous medium, or storage stability is inferior; and when it exceeds 30 mg KOH/g the resulting aqueous dispersions become very highly viscous, the proportion of painted solids of water-based paint compositions prepared from these is lowered and they are inferior as regards sagging.

When the hydroxyl value of the acrylic graft copolymer (A-2) is less than 50 mg KOH/g there are insufficient points for crosslinking between the resulting acrylic graft copolymers (A-2) and the amino resin (C) used as a curing agent, and consequently paint films obtained are inferior in resistance to chemicals; and when it exceeds 150 mg KOH/g it becomes excessively hydrophilic, and the paint films obtained are inferior in water-resistance.

Similarly, when the glass transition temperature of the acrylic graft copolymer (A-2) is less than −20° C. the acrylic graft copolymer (A-2) is prone to conglutinate in aqueous media, so that the storage stability of aqueous dispersions is inferior; and when the glass transition temperature exceeds +50° C. the smoothness of paint films from water-based paint compositions containing this acrylic graft copolymer (A-2) is inferior.

When the number average molecular weight of the acrylic graft copolymer (A-2) is less than 10,000 paint films formed from water-based paint compositions prepared from this acrylic graft copolymer (A-2) are inferior in resistance to chemicals; and when it exceeds 100,000 there is a risk that gelling will occur when making the acrylic graft copolymer.

The acrylic graft copolymers (A) such as (A-1) and (A-2) employed in the present invention can be made into aqueous dispersions by neutralizing with a basic substance and dispersion in an aqueous dispersion medium, after removing the solvent employed in making them if necessary. Dispersion in an aqueous dispersion medium can be performed by an ordinary method: it can be performed for example by neutralizing at least 50% of the carboxyl groups present in the acrylic graft copolymer (A) by using monomethylamine, dimethylamine, trimethylamine, diethylenetriamine, diethanolamine, dimethylethanolamine, piperazine, ammonia or sodium hydroxide, etc., for example as a basic substance. An aqueous dispersion medium in which water accounts for 40–80 wt % is preferred.

An aqueous dispersion thus obtained can be combined as it stands, or after concentration or dilution or drying and resuspension, with internally non-crosslinked acrylic fine particles (B), an amino resin (C) and an alkali-swelling organic extender (D) described below, etc., to prepare a water-based paint composition.

The internally non-crosslinked fine particles (B) employed in the present invention are internally non-crosslinked fine particles made by performing free radical polymerization of α,β-ethylenic unsaturated monomers (b1) by a known emulsion polymerization method in an aqueous medium in the presence of a surfactant, and besides being employed as a basic resin which becomes the film-forming component of the water-based paint composition, are a component which confers pseudoplastic or thixotropic properties on the water-based paint composition.

The copolymerization here can be performed with an α,β-ethylenic unsaturated monomer (b1-1) containing a carboxyl group and an α,β-ethylenic unsaturated monomer (b1-2) containing a hydroxyl group as essential components, and other copolymerizable monomers as required. As these monomers the same monomers indicated in connection with the aforementioned acrylic copolymer (a1-1) can be employed.

There is no specific restriction as to the method for emulsion polymerization, examples of which include seeded polymerization, 2-stage emulsion polymerization, 2-stage polymerization in the presence of a seeded emulsion, and the power feed method, etc.

The surfactant employed for emulsion polymerization is preferably an anionic or non-ionic surfactant. Examples of such surfactants include sodium dodecylbenzenesulfonate, ammonium dodecylbenzenesulfonate, ammonium polyoxyethylene lauryl ether sulfate, sodium alkylphenylpolyoxyethylene sulfate, ammonium alkylphenylpolyoxyethylene sulfate, polyoxyethylene oleyl ether and polyoxyethylene tridecyl ether, etc. The quantity of surfactant added will differ depending on the emulsifying capacity of the surfactant employed and the particle size of the internally non-crosslinked acrylic fine particles (B) to be obtained as a result, but it is generally in the range 0.05–5 wt %, and preferably 0.1–4 wt % relative to the water.

There is no specific restriction as to the polymerization initiator employed for emulsion polymerization, and organic peroxides, inorganic peroxides, azo type polymerization initiators and redox type polymerization initiators can be employed: examples include benzoyl peroxide, t-butyl peroxybenzoate, t-butyl peroxyoctanoate, ammonium persulfate, sodium persulfate, and the ferrous salt of hydrogen peroxide, etc.

The internally non-crosslinked acrylic fine particles employed are particles (B) having an acid value of 15–200 mg KOH/g, and preferably 20–100 mg KOH/g, and a hydroxyl value of 15–200 mg KOH/g, and preferably 20–100 mg KOH/g. It is also desirable that particles with a glass transition temperature a −20 to +50° C., and preferably 0 to +30° C., and a mean particle size in an aqueous medium of 20–150 nm, and preferably 50–100 nm, are employed.

When the acid value is less than 15 mg KOH/g there is a proneness to flocculate, so that the storage stability of the water-based paint composition is inferior. The benefits in conferring pseudoplastic or thixotropic properties on the water-based paint composition are also weakened, aluminum bittiness is prone to be produced and ease of application is inferior. On the other hand, when the acid value exceeds 200 mg KOH/g they become excessively hydrophilic and the water-resistance of the resulting paint films is inferior.

When the hydroxyl value is less than 15 mg KOH/g there are insufficient points of crosslinking with the amino resin (C) and the resulting paint films are inferior in chemical resistance; and when the hydroxyl value exceeds 200 mg KOH/g they become excessively hydrophilic and consequently the water-resistance of the resulting paint films is inferior.

Similarly, when the glass transition temperature is less than −20° C. the acrylic fine particles (B) are prone to conglutinate in aqueous media, so that the storage stability of aqueous dispersions is inferior; and when the glass transition temperature exceeds 50° C. the smoothness of paint films is inferior.

When the particle size of the acrylic fine particles (B) is less than 20 nm a large quantity of surfactant is necessary for making them and therefore the water-resistance of the resulting paint films is inferior. On the other hand, when the particle size exceeds 150 nm the surface area effect of the acrylic fine particles (B) is considerably decreased, the benefits in conferring pseudoplastic or thixotropic properties on the water-based paint compositions are weakened, aluminum bittiness is prone to be produced and ease of application is inferior.

The amino resin (C) employed in the present invention is an amino resin of a number average molecular weight of ≦1000, and preferably 300–800, and is the crosslinking component (curing agent) of the water-based paint composition. Examples of such amino resins (C) include the commercial products Cymel 301, Cymel 303, Cymel 325 and Cymel 327 (trade names Mitsui Scitec KK), Nikalac MW-30 and Nikalac MX43 (trade names Sanwa Chemical KK) and Yuban 120 (trade name Mitsui Toatsu Chemicals), etc. The number average molecular weight of the amino resin (C) is the number average molecular weight based on polystyrene, determined by gel-permeation chromatograph according to the normal method. When the number average molecular weight (C) of the amino resin (C) exceeds 1000 it is difficult to disperse in aqueous media and the stability of the water-based paint composition is inferior.

The organic thickener swelled by alkalis (D) employed in the present invention is a component which confers further pseudoplastic or thixotropic properties on the water-based paint composition, and it is particularly efficacious when including a phosphorescent pigment in the water-based paint composition as in metallic paint compositions. Examples of organic thickeners swelled by alkalis (D) include ASE-60 (trade name Rohm and Haas) and Thickensol-150B (trade name Kyoei Chemical), etc.

Water-based paint compositions of the present invention comprise aqueous dispersions containing an aforementioned water-dispersible acrylic graft co-polymer (A) and internally non-crosslinked acrylic fine particles (B) as essential components, and optionally also an amino resin (C) and/or a thickener swelled by alkalis (D).

When it does not contain component (C) the contents of component (A) and component (D) in the total resin solids of the water-based paint composition are 10–90 wt %, and preferably 40–80 wt %, for component (A) and 10–90 wt %, and preferably 20–60 wt % for component (B). When it contains (C) there is 20–80 wt %, and preferably 30–70 wt %, of component (A), 20–80 wt %, and preferably 30–70 wt %, of component (B), and 10–40 wt %, and preferably 20–40 wt %, of component (C).

The content of component (D) is 0.1–5 wt %, and preferably 0.5–4 wt %, of the total resin solids in the water-based paint composition.

With less than the lower limit of component (A) the primary resin in the water-based paint composition is inadequate and the basic performance of the resulting paint film is inferior. On the other hand, when it exceeds the upper limit above the action of component (B) is considerably damaged and ease of application of the water-based paint composition is inferior.

With less than the lower limit of component (B) the benefits in terms of conferring pseudoplasticity or thixotropy on the water-based paint composition are weakened and ease of application is inferior. On the other hand, when it exceeds the upper limit above, the quantity of surfactant included in the water-based paint composition is increased and the water-resistance of the resulting paint film is inferior.

When component (C) is within the range above, the resulting paint film show even better resistance to chemicals and resilience than when component (C) is not included.

Component (D) is efficacious in the preparation of metallic paint compositions; when the content thereof is less that 0.1 wt % bittiness is produces, and when it exceeds 5 wt % the water-resistance of the paint film is inferior because of the high acid value of component (D).

Organic solvents can optionally be added to a water-based paint composition of the present invention. Examples of such organic solvents include ethylene glycol monoethyl ether, ethylene glycol monobutyl ether, diethylene glycol mo[no]butyl ether, ethylene glycol monohexyl ether, propylene glycol monomethyl ether, propylene glycol monoethyl ether and propylene glycol monobutyl ether, etc.

Metallic pigments, inorganic pigments and/or organic pigments, etc., can also optionally be added. There is no specific restriction as to the method of adding pigments, and this can be performed by a known method. Moreover, other known additives added to water-based paints, such as acid catalysts, surface regulators and/or blistering inhibitors, etc., can also optionally be included.

Water-based paint compositions of the present invention have extremely outstanding storage stability, there are easy to apply because they have pseudoplastic and/or thixotropic properties, and paint films obtained from them have excellent paint film performance traits such as water-resistance, durability and smoothness, etc.

Water-based paint compositions of the present invention can primarily be employed as undercoats for automobiles, and in this case they can be handled in the same way as ordinary undercoats, and they can particularly suitably be employed in prior known 2-coats 1-bake painting systems in which the undercoat and the top coat are applied wet-on-wet and then the two are baked at the same time.

The benefits recorded in the present invention can be obtained when the various numerical ranges hitherto explained, for example the property values of the acrylic copolymers and monomer combinations, the proportions in which they are reacted, the property values of the acrylic graft copolymer (A), and the contents of components (A)–(D), etc., are in the ranges recorded; and particularly outstanding benefits can be obtained when the numerical ranges of the different values are the ranges defined as the preferred ranges.

By using as the base resin an acrylic graft copolymer (A) in which a component of high acid value and a component of low acid value are chemically linked, and further including internally non-crosslinked acrylic fine particles (B), water-based paint compositions of the present invention allow broad scope for base resin design and low solvent use, they do not produce blistering, sagging or bittiness, and they give paint films of outstanding water-resistance, durability and smoothness etc.

Including an amino resin (C) in a water-based paint composition of the present invention further improves the resilience of the paint film and its resistance to chemicals.

Including a thickener swelled by alkalis (D) in a water-based composition of the present invention confers further pseudoplasticity and thixotropy when phosphorescent pigments are included as in a metallic paint composition, and improves ease of application.

The present invention will next be explained in even more detail by means of practical embodiments; however, these embodiments do not imply any restrictions as to the scope of the present invention. In the examples "parts" indicates "parts by weight" except where specifically stated otherwise. The method of application and the methods for evaluating paint film appearance, paint film performance and storage stability are as follows.

The following were used as test sheets to be painted. Thus, sheet steel treated with zinc phosphate, electrocoated with a cathodic deposition paint (Aqua No. 4200; trade name Nippon Oil & Fats) to give a dry film thickness of 20 $\mu$m, baked at 175° C. for 20 minutes, air sprayed with a middle coat paint (Haiepiko No. 100 CP Sealer; trade name Nippon Oil & Fats) to give a dry film thickness of 40 $\mu$m and baked at 140° C. for 20 minutes was used.

These test sheets were painted with the water-based paint compositions prepared in the different examples by the known 2-coats 1-bake method. Thus, the water-based paint composition was spray-coated in a painting environment at a temperature of 25° C. and a relative humidity of 75% to give a dry film thickness of approximately 15 $\mu$m, followed by drying by heating at a temperature of 80° C. for 10 minutes, cooling to room temperature, and then spray coating with a commercial clear top coat (Belcoat No. 6000; trade name Nippon Oil & Fats) to give a dry film thickness of approximately 40 $\mu$m followed, after setting for 10 minutes, by baking at 140° C. for 30 minutes. The object to be painted was held perpendicular throughout the entire process.

1) 60° Gloss

JIS K5400 (1990) 7.6 mirror-surface gloss.

2) Smoothness

The paint film was observed visually and evaluated using the following criteria.

○: satisfactory

×: inferior

3) Aluminum bittiness

The paint film was observed visually and evaluated using the following criteria.

○: no bittiness

×: bittiness

4) Sagging

A hole 10 mm in diameter was opened in the object to be painted and the length of sagging under the hole after painting to give a dry film thickness of 20 $\mu$m was assessed according to the following criteria.

○: less than 2 mm

×: $\geq$2 mm

1) Water-resistance

The state of the painted surface was observed visually after immersion for 4 hours in hot water at 90° C., and evaluated according to the following criteria.

○: no abnormality

×: blistering

2) Resistance to chemicals

The state of the painted surface was observed visually after immersion for 1 hour in regular petrol at 40° C., and evaluated according to the following criteria.

○: no abnormality

×: shrinkage

3) Resilience

Evaluated by JIS K5400 (1990) 8.3 Dupont impact resistance, assessed according to the following criteria after dropping the weight from a height of 20 cm.

○: not able to be cracked or detached

×: cracking or detachment produced

Evaluated by the change (%) in viscosity of the water-based paint composition after storage at 40° C. for 20 days compared with initial viscosity (ps/6 rpm (B type viscosimeter)), according to the following criteria.

○: less than ±15%

×: ≧+15%

Preparation Example 1-1
Making an Acrylic Graft Copolymer (A-1)

Methyl isopropyl ketone 56.4 parts was put into a reaction vessel equipped with a stirrer, a temperature regulator, a cooling tube and a dropping device, stirred as the temperature was raised, and refluxed. A mixture of 41.8 parts of 2-hydroxyethyl methacrylate, 11.6 parts of acrylic acid, 93.6 parts of n-butyl acrylate, 33.0 parts of 2-ethylhexyl methacrylate and 3.6 parts of azobisisobutyronitrile was then added dropwise over 2 hours. Stirring under reflux was continued for a further 2 hours to complete the polymerization (this reaction process is termed "Process 1" hereafter).

The resin obtained was an acrylic copolymer having an acid value of 50 mg KOH/g, a hydroxyl value of 100 mg KOH/g, a glass transition temperature of -20° C. and a number average molecular weight of 5000.

A further 328.6 parts of methyl isobutyl ketone was then added to this resin solution, and it was stirred under reflux. A mixture of 5.1 parts of glycidyl methacrylate, 97.5 parts of 2-hydroxyethyl methacrylate, 200.2 parts of methyl methacrylate, 122.3 parts of n-butyl acrylate and 6.3 parts of azobisisobutyronitrile was then added dropwise over 2 hours. After further stirring for 1 hour at a reaction temperature of 120° C., the temperature was raised to 130° C. and the addition and copolymerization reactions were completed by continuing stirring for a further 5 hours (this reaction process is termed "Process 2" hereafter).

The resin solution obtained was a resin solution which included an acrylic graft copolymer A-1-1 having an acid value of 12 mg KOH/g, a hydroxyl value of 100 mg KOH/g, a glass transition temperature of +13° C. and a number average molecular weight of 42,000.

Preparation Examples 1-2 to 1-4
Making an Acrylic Graft Copolymer (A-1)

Acrylic graft copolymers A-1-2 to A-1-4 were made by the same method as in Preparation Example 1-1, according to the formulations in Table 1 or Table 2.

TABLE 1

| Acrylic graft copolymer No. | A-1-1 | A-1-2 |
|---|---|---|
| Process 1 (parts by weight) | | |
| Solvent composition | | |
| Methyl isopropyl ketone | 56.4 | 155.2 |
| Toluene | — | — |
| Monomer composition | | |
| 2-Hydroxyethyl methacrylate | 41.8 | 55.7 |
| Acrylic acid | 11.6 | 15.4 |
| n-Butyl acrylate | 93.6 | 124.9 |
| 2-Ethylhexyl methacrylate | 33.0 | 44.0 |
| Styrene | — | — |
| Initiator | | |
| Azobisisobutyronitrile | 3.6 | 4.8 |
| t-BPOEH *1 | — | — |
| t-butyl peroxybenzoate | — | — |
| Reaction temperature | reflux | reflux |
| Process 2 (parts by weight) | | |
| Solvent composition | | |
| Methyl isopropyl ketone | 328.6 | 227.6 |
| Toluene | — | — |
| Ethylene glycol monobutyl ether | — | — |
| Monomer composition | | |
| 2-Hydroxyethyl methacrylate | 97.5 | 83.6 |
| Acrylic acid | — | — |
| Methyl methacrylate | 200.2 | 171.6 |
| n-Butyl acrylate | 122.3 | 104.8 |
| Styrene | — | — |
| Glycidyl methacrylate | 5.1 | 7.0 |
| Initiator | | |
| Azobisisobutyronitrile | 6.3 | 5.4 |
| t-BPOEH *1 | — | — |
| t-butyl peroxybenzoate | — | — |
| Reaction temperature | reflux | reflux |
| Properties of component (al-1) obtained by Process 1 | | |
| Acid value (mg KOH/g) | 50 | 50 |
| Hydroxyl value (mg KOH/g) | 100 | 100 |
| Glass transition temperature (°C.) | -20 | -20 |
| Number average molecular weight | 5000 | 4900 |
| Properties of monomer combination (a2-1) polymerized in Process 2 | | |
| Acid value (mg KOH/g) | 0 | 0 |
| Hydroxyl value (mg KOH/g) | 100 | 100 |
| Glass transition temperature (°C.) | +30 | +30 |
| Properties of the acrylic graft copolymer | | |
| Acid value (mg KOH/g) | 12 | 15 |
| Hydroxyl value(mg KOH/g) | 100 | 100 |
| Glass transition temperature (°C.) | +13 | +8 |
| Number average molecular weight | 42000 | 32000 |
| Component (al-1)/component (mm-1) (w/w) | 30/70 | 40/60 |
| Component (m-3)/component (al-1) mol ratio | 1.0 | 1.0 |

*1 t-BPOEH : t-Butylperoxy-2-ethylhexanoate

TABLE 2

| Acrylic graft copolymer No. | A-1-3 | A-1-4 |
|---|---|---|
| Process 1 (parts by weight) | | |
| Solvent composition | | |
| Methyl isopropyl ketone | — | 77.9 |
| Toluene | 77.0 | — |
| Monomer composition | | |
| 2-Hydroxyethyl methacrylate | 27.9 | 41.8 |
| Acrylic acid | 15.4 | 15.4 |
| n-Butyl acrylate | 28.7 | 3.2 |
| 2-Ethylhexyl methacrylate | 48.0 | 47.6 |
| Styrene | — | 12.0 |
| Initiator | | |
| Azobisisobutyronitrile | — | — |
| t-BPOEH *1 | 3.0 | — |
| t-butyl peroxybenzoate | — | 3.6 |
| Reaction temperature | reflux | reflux |

TABLE 2-continued

| Acrylic graft copolymer No. | A-1-3 | A-1-4 |
|---|---|---|
| Process 2 (parts by weight) | | |
| Solvent composition | | |
| Methyl isopropyl ketone | — | 303.0 |
| Toluene | 156.9 | — |
| Ethylene glycol monobutyl ether | 150.0 | — |
| Monomer composition | | |
| 2-Hydroxyethyl methacrylate | 111.4 | 110.9 |
| Acrylic acid | — | — |
| Methyl methacrylate | 228.8 | 134.9 |
| n-Butyl acrylate | 139.8 | 138.2 |
| Styrene | — | 96.0 |

TABLE 2-continued

| Acrylic graft copolymer No. | A-1-3 | A-1-4 |
|---|---|---|
| Glycidyl methacrylate | 3.5 | 3.5 |
| Initiator | | |
| Azobisisobutyronitrile | — | — |
| t-BPOEH *1 | 9.6 | — |
| t-butyl peroxybenzoate | — | 12.0 |
| Reaction temperature | 120° C. | reflux |
| Properties of component (al-1) obtained by Process 1 | | |
| Acid value (mg KOH/g) | 100 | 100 |
| Hydroxyl value (mg KOH/g) | 100 | 150 |
| Glass transition temperature (°C.) | 0 | +30 |
| Number average molecular weight | 4900 | 4800 |
| Properties of monomer combination (a2-1) polymerized in Process 2 | | |
| Acid value (mg KOH/g) | 0 | 0 |
| Hydroxyl value (mg KOH/g) | 100 | 100 |
| Glass transition temperature (°C.) | +30 | +30 |
| Properties of the acrylic graft copolymer | | |
| Acid value (mg KOH/g) | 18 | 20 |
| Hydroxyl value(mg KOH/g) | 100 | 107 |
| Glass transition temperature (°C.) | +23 | +30 |
| Number average molecular weight | 34000 | 31000 |
| Component (al-1)/component (mm-1) (w/w) | 20/80 | 20/80 |
| Component (m-3)/component (al-1) mol ratio | 1.0 | 1.0 |

*1 t-BPOEH : t-Butylperoxy-2-ethylhexanoate

Preparation Example 2-1
Making an Aqueous Dispersion

Ethylene glycol monobutyl ether 80 parts was added to 533 parts of acrylic graft copolymer A-1-1 obtained in Preparation Example 1-1, and then 205 parts of methyl isopropyl ketone was distilled off under decreased pressure. Dimethylethanolamine 3.0 parts (equivalent to 50% of the carboxyl groups) was added to this polymer solution, and after stirring 588.9 parts of deionized water was added and stirred to give an even dispersion and obtain a milky white low-viscosity aqueous dispersion A-1-1aq of the acrylic graft copolymer A-1-1 (see Table 7).

Preparation Example 2-1 to 2-4
Making an Aqueous Dispersion

Aqueous dispersions A-1-2aq to A-1-4aq of acrylic graft copolymers A-1-2 to A-1-4 were obtained by the same method as in Preparation Example 2-1 with the combinations shown in Table 7.

TABLE 3

| Aqueous dispersion No. | A-1-1aq | A-1-2aq | A-1-3aq | A-1-4aq |
|---|---|---|---|---|
| Type of acrylic graft copolymer | A-1-1 | A-1-2 | A-1-3 | A-1-4 |
| Graft copolymer included | 533.0 | 533.0 | 533.0 | 533.0 |
| Ethylene glycol monobutyl ether | 80.0 | 80.0 | — | 80.0 |
| Methyl isopropyl ketone distilled off under decreased pressure | 205.0 | 204.0 | — | 205.0 |
| Toluene distilled off under decreased pressure | — | — | 124.0 | — |
| Dimethylethanolamine | 3.0 | 3.8 | 4.6 | 5.1 |
| Deionized water | 588.9 | 587.2 | 586.4 | 586.9 |
| Nature of the aqueous dispersion obtained | milky white low-viscosity liquid | milky white low-viscosity liquid | milky white low-viscosity liquid | milky white low-viscosity liquid |

Note 1: Low-viscosity means ≦1 ps at 25° C.
Note 2: Units parts by weight

Preparation Example 5-1
Making an Acrylic Graft Copolymer (A-2)

Toluene 116.4 parts was put into a reaction vessel equipped with a stirrer, a temperature regulator, a cooling tube and a dropping device, stirred as the temperature was raised, and refluxed. A mixture of 41.8 parts of 2-hydroxyethyl methacrylate, 18.5 parts of acrylic acid, 64.3 parts of n-butyl acrylate, 55.4 parts of n-butyl methacrylate and 3.6 parts of azobis-isobutyronitrile was added dropwise over 2 hours. Then stirring was continued for a further 2 hours to complete the polymerization (this reaction process is termed "Process (1)" hereafter).

Next, 7.4 parts of α,α-dimethylisopropenylbenzyl isocyanate and 0.1 part of dibutyltin dilaurate were put into this resin solution, and stirring was continued for 1 hour at 80° C. (this reaction process is termed "Process (2)" hereafter).

The resin obtained was an acrylic copolymer having an acid value of 80 mg KOH/g, a hydroxyl value of 100 mg KOH/g, a glass transition temperature of 0° C. and a number average molecular weight of 4900.

Then 266.2 parts of toluene were put into this resin solution and it was stirred under reflux. Then a mixture of 97.4 parts of 2-hydroxyethyl methacrylate, 173.4 parts of n-butyl acrylate, 149.2 parts of methyl methacrylate and 6.3 parts of azobisisobutyronitrile was added dropwise to this resin solution over 2 hours. The reaction was completed by continuing stirring for a further 2 hours (this reaction process is termed "Process (3)" below).

The resin solution obtained was a resin solution containing an acrylic graft copolymer A-2-1 having an acid value of 24 mg KOH/g, a hydroxyl value of 96 mg KOH/g, a glass transition temperature of +7° C. and a number average molecular weight of 32,000 (see Table 4 to Table 6).

Preparation Example 3-2 to 3-4

Making an Acrylic Graft Copolymer (A-2)

Acrylic graft copolymers A-2-2 to A-2-4 were made by the same method as in Preparation Example 3-1, with the formulations in Table 4 to Table 6. Properties, etc., are shown in Table 4 to Table 6.

TABLE 4

| | (parts by weight) | | | |
|---|---|---|---|---|
| Acrylic graft copolymer No. | A-2-1 | A-2-2 | A-2-3 | A-2-4 |
| Process 1 | | | | |
| Solvent | | | | |
| Toluene | 116.4 | 155.2 | 97.7 | 77.0 |
| Methyl isobutyl ketone | — | — | — | — |
| Monomer composition | | | | |
| 2-Hydroxyethyl methacrylate | 41.8 | 33.4 | 41.8 | 22.3 |
| Acrylic acid | 18.5 | 21.6 | 15.4 | 12.3 |
| n-Butyl acrylate | 64.3 | 105.6 | 78.7 | 22.8 |

TABLE 4-continued

| | (parts by weight) | | | |
|---|---|---|---|---|
| Acrylic graft copolymer No. | A-2-1 | A-2-2 | A-2-3 | A-2-4 |
| n-Butyl methacrylate | 55.4 | 79.4 | — | 50.6 |
| 2-Ethylhexyl methacrylate | — | — | 14.1 | — |
| Styrene | — | — | — | 12.0 |
| Polymerization initiator | | | | |
| Azobisbutyronitrile | 3.6 | 4.8 | — | — |
| t-BPOEH *1 | — | — | — | 3.0 |
| t-Butyl peroxybenzoate | — | — | 2.3 | — |
| Reaction temperature | reflux | reflux | reflux | reflux |
| Process 2 | | | | |
| Monomers | | | | |
| α,α-Dimethylisopropenylbenzyl isocyanate | 7.4 | 9.9 | 3.6 | 4.9 |
| Catalyst | | | | |
| Dibutyltin laurate | 0.1 | 0.2 | 0.1 | 0.1 |
| Reaction temperature | 80° C. | 80° C. | 80° C. | 80° C. |

*1 t-BPOEH: t-Butylperoxy-2-ethylhexanoate

TABLE 5

| | (parts by weight) | | | |
|---|---|---|---|---|
| Acrylic graft copolymer No. | A-2-1 | A-2-2 | A-2-3 | A-2-4 |
| Process 3 | | | | |
| Solvent | | | | |
| Toluene | 266.2 | 220.9 | 285.0 | 305.4 |
| Methyl isobutyl ketone | — | — | — | — |
| Monomer composition | | | | |
| 2-Hydroxyethyl methacrylate | 97.4 | 66.9 | 125.3 | 89.1 |
| Acrylic acid | — | 4.6 | — | — |
| Methyl methacrylate | 149.2 | 136.4 | 113.1 | 171.1 |
| n-Butyl acrylate | 173.4 | 152.1 | 211.6 | 171.8 |
| Styrene | — | — | — | 48.0 |
| Polymerization initiator | | | | |
| Azobisbutyronitrile | 6.3 | — | — | — |
| t-BPOEH *1 | — | — | — | 9.6 |
| t-Butyl peroxybenzoate | — | 9.0 | 11.3 | — |
| Reaction temperature | reflux | reflux | reflux | reflux |

*1 t-BPOEH: t-Butylperoxy-2-ethylhexanoate

TABLE 6

| Acrylic graft copolymer No. | | | A-2-1 | A-2-2 | A-2-3 | A-2-4 |
|---|---|---|---|---|---|---|
| Properties of the acrylic copolymer obtained in Process 1 | Acid value | (mg KOH/g) | 80 | 70 | 80 | 80 |
| | Hydroxyl value | (mg KOH/g) | 100 | 60 | 120 | 80 |
| | Glass transition temp. | (° C.) | 0 | −10 | −15 | +20 |
| | Number av. mol. wt. | | 4900 | 4900 | 8500 | 4900 |
| Properties of the monomer combination polymerized in Process 3 | Acid value | (mg KOH/g) | 0 | 10 | 0 | 0 |
| | Hydroxyl value | (mg KOH/g) | 100 | 80 | 120 | 80 |
| | Glass transition temp. | (° C.) | +10 | +10 | 0 | +20 |
| Properties of the acrylic graft copolymer | Acid value | (mg KOH/g) | 24 | 28 | 20 | 16 |
| | Hydroxyl value | (mg KOH/g) | 96 | 67 | 118 | 78 |
| | Glass transition temp. | (° C.) | +7 | +2 | −4 | +20 |
| | Number av. mol. wt. | | 32000 | 27000 | 45000 | 38000 |
| | (a1-2)/(mm-1) (w/w) | | 30/70 | 40/60 | 25/75 | 20/80 |
| | (m-5)/(a1-a) mol ratio | | 1.0 | 1.0 | 1.0 | 1.0 |

Preparation Example 4-1

Making an Aqueous Dispersion

After adding 80.0 parts of ethylene glycol monobutyl ether to 533.0 parts of acrylic graft copolymer A-2-1 obtained in Preparation Example 3-1, 207.3 parts of toluene were distilled off at decreased pressure. Dimethylmethanolamine 6.1 parts was added to this polymer solution (equivalent to 50% of the carboxyl groups), and after stirring 588.2 parts of deionized water was added and stirred to give a uniform dispersion, and obtain a milky white low-viscosity aqueous dispersion A-2-1aq of acrylic graft copolymer A-2-1 (see Table 7).

Preparation Examples 4-2 to 4-4

Making an Aqueous Dispersion

Aqueous dispersions A-2-2aq to A-2-4aq of acrylic graft copolymers A-2-2 to A-2-4 were obtained by the same method as in Preparation Example 4-1 with the combinations in Table 7.

TABLE 7

| Aqueous dispersion No. | A-2-1aq | A-2-2aq | A-2-3aq | A-2-4aq |
|---|---|---|---|---|
| Type of acrylic graft copolymer | A-2-1 | A-2-2 | A-2-3 | A-2-4 |
| Graft copolymer included | 533.0 | 533.0 | 533.0 | 533.0 |
| Ethylene glycol monobutyl ether | 80.0 | 80.0 | — | 80.0 |
| Methyl isopropyl ketone distilled off under decreased pressure | 207.3 | 200.5 | 204.0 | 203.8 |
| Toluene distilled off under decreased pressure | — | — | — | — |
| Dimethylethanolamine | 6.1 | 7.1 | 5.1 | 4.1 |
| Deionized water | 589.0 | 580.4 | 585.9 | 586.7 |
| Nature of the aqueous dispersion obtained | milky white low-viscosity liquid | milky white low-viscosity liquid | milky white low-viscosity liquid | milky white low-viscosity liquid |

Preparation Example 5-1
Making Internally Non-Crosslinked Acrylic Fine Particle (B)

Deionized water 606 parts and 3.0 parts of Ereminol ES-12 (surfactant; trade name Sanyo Chemicals) were put into a 4-mouthed flask fitted with a stirrer, a thermometer, a reflux cooling tube and a tube for introducing nitrogen gas, and held at 80° C. stirred in a stream of nitrogen. Then 250.6 parts of a mixture (1) of 47.8 parts of n-butyl acrylate, 71.6 parts of methyl methacrylate, 30.6 parts of 2-hydroxyethyl acrylate, 0.6 parts of Ereminol ES-12 and 100 parts of deionized water was formed into a pre-emulsified dispersion and, stirring at 80° C., a polymerization initiator (1) of 0.6 parts of ammonium persulfate dissolved in 19.4 parts of deionized water was added dropwise in parallel with this emulsion over 2 hours. The mixture was stirred at 80° C. for a further 1 hour to mature the core of the acrylic fine particles. Then 100.4 parts of pre-emulsified dispersion of a mixture (2) of 30 parts of n-butyl acrylate, 10.8 parts of 2-hydroxyethyl acrylate, 9.2 parts of methacrylic acid, 0.4 parts of Ereminol ES-12 and 50 parts of deionized water, and a polymerization initiator (2) of 0.2 parts of ammonium persulfate dissolved in 19.8 parts of deionized water were added dropwise in parallel over 1 hour. The reaction was completed by stirring at 80° C. for a further 2 hours, to obtain internally non-crosslinked acrylic fine particles B-1 having an acid value of 30 mg KOH/g, a hydroxyl value of 100 mg KOH/g, a glass transition temperature of +3° C. and a mean particle size of 60 nm. The mean particle size was determined in an aqueous medium using a NICOMP 370 Sub-micron Particle Sizer (trade mark Pacific Scientific Instrument Company) (see Table 8).

Preparation Example 5-2 to 5-4
Making Internally Non-Crosslinked Acrylic Fine Particles (B)

Internally non-crosslinked acrylic fine particles B-2 to B-4 were made by the same method as in Preparation Example 5-1 with the combinations shown in Table 8.

TABLE 8

| Acrylic fine particle No. | B-1 | B-2 | B-3 | B-4 |
|---|---|---|---|---|
| Put into the reaction tank | | | | |
| Deionized water | 606 | 606 | 606 | 606 |
| Ereminol ES-12 *1 | 3 | 3 | 3 | 3 |
| Mixture (1) | | | | |
| n-Butyl acrylate | 47.8 | 46.7 | 46.4 | 67.5 |
| Methyl methacrylate | 71.6 | 71.6 | 71.6 | 82.5 |
| 2-Hydroxyethyl acrylate | 30.6 | 31.7 | 32.0 | — |
| Ereminol ES-12 *1 | 0.6 | 0.6 | 0.6 | 0.6 |
| Deionized water | 100 | 100 | 100 | 100 |
| Polymerization initiator (1) | | | | |
| Ammonium persulphate | 0.6 | 0.6 | 0.6 | 0.6 |
| Deionized water | 19.4 | 19.4 | 19.4 | 19.4 |
| Mixture (2) | | | | |
| n-Butyl acrylate | 30 | 25.0 | 10 | 28.4 |
| 2-Hydroxyethyl acrylate | 10.8 | 9.7 | 9.4 | 12.4 |
| Methacrylic acid | 9.2 | 15.3 | 30.6 | 9.2 |
| Ereminol ES-12 *1 | 0.4 | 0.4 | 0.4 | 0.4 |
| Deionized water | 50 | 50 | 50 | 50 |
| Polymerization initiator (2) | | | | |
| Ammonium sulfate | 0.2 | 0.2 | 0.2 | 0.2 |
| Deionized water | 19.8 | 19.8 | 19.8 | 19.8 |
| Properties of the internally non-crosslinked acrylic fine particles (B) | | | | |
| Acid value (mg KOH/g) | 30 | 50 | 100 | 30 |
| Hydroxyl value (mg KOH/g) | 100 | 100 | 100 | 30 |
| Glass transition temperature (°C.) | 3 | 9 | 26 | 4 |
| Mean particle size (nm) | 60 | 80 | 100 | 60 |

*1 Trade name Sanyo Chemicals

Embodiments 1–11

Metallic water-based paint compositions having a solids content of 32 wt % were prepared on the basis of the combinations shown in Table 9 to Table 11 by adding an aqueous dispersion obtained in Preparation Example 2-1 to 2-4 and Preparation Example 4-1 to 4-4, internally non-crosslinked acrylic fine particles B-1 to B-4 obtained in Preparation Example 5-1 to 5-4, aluminum paste (Alupaste 0539X; special processed aluminum for water-based paint; heat residue 69 wt % (trade name Toyo Aluminum), an amino resin (Cymel 327; trade name Mitsui Scitec), an organic thickener swelled by alkalis (Primal ASE-60; trade name Rohm & Haas), dimethylethanolamine and deionized water. When the solids content of the water-based paint composition was ≦32 wt % viscosity was adjusted without adding deionized water. These metallic water-based paint compositions were adjusted to a viscosity of 15±2 ps using a B type viscosimeter at a rotation rate of 6 rpm, by adding water, and evaluated according to the aforementioned methods.

The results for appearance and performance of the resulting paint films, and the results for storage stability, are shown in Table 12.

TABLE 9

| | (parts by weight) | | | |
|---|---|---|---|---|
| Embodiment No. | 1 | 2 | 3 | 4 |
| Aqueous dispersion | | | | |
| A-1-1aq | 517.2 | — | — | — |
| A-1-2aq | — | 517.2 | — | — |
| A-1-3aq | — | — | 517.2 | — |
| A-1-4aq | — | — | — | 517.2 |
| A-2-1aq | — | — | — | — |
| A-2-2aq | — | — | — | — |
| A-2-3aq | — | — | — | — |
| A-2-4aq | — | — | — | — |
| Acrylic fine particles | | | | |
| B-1 | 137.9 | 137.9 | 137.9 | 137.9 |
| B-2 | — | — | — | 13 |
| B-3 | — | — | — | — |
| B-4 | — | — | — | — |
| Dimethylethanolamine | 3.3 | 3.5 | 3.6 | 3.7 |
| Cymel 327 *1 | 91.9 | 91.9 | 91.9 | 91.9 |
| Aluminum paste *2 | 59.9 | 59.9 | 59.9 | 59.9 |
| Ethylene glycol monobutyl ether | 60.6 | 60.6 | 60.6 | 60.6 |
| Thickener *3 | 4.7 | 4.7 | 4.7 | 4.7 |
| Deionized water | 124.5 | 124.3 | 124.2 | 124.1 |
| Deionized water to adjust viscosity | 15.9 | 32.2 | 66.7 | 103.4 |
| Total | 1015.9 | 1032.2 | 1066.7 | 1103.4 |
| Paint solids | 31.5% | 31.0% | 30.0% | 29.0% |

*1 Trade name Mitsui Scitec
*2 Alupaste 0539X (trade name Toyo Aluminum)
*3 Primal ASE-60 (trade name Rohm & Haas)

TABLE 10

| | (parts by weight) | | | |
|---|---|---|---|---|
| Embodiment No. | 5 | 6 | 7 | 8 |
| Aqueous dispersion | | | | |
| A-1-1aq | — | — | — | — |
| A-1-2aq | — | — | — | — |
| A-1-3aq | — | — | — | — |
| A-1-4aq | — | — | — | — |
| A-2-1aq | 517.2 | — | — | — |
| A-2-2aq | — | 517.2 | — | — |
| A-2-3aq | — | — | 517.2 | — |
| A-2-4aq | — | — | — | 517.2 |
| Acrylic fine particles | | | | |
| B-1 | 137.9 | 137.9 | 137.9 | 137.9 |
| B-2 | — | — | — | — |
| B-3 | — | — | — | — |
| B-4 | — | — | — | — |
| Dimethylethanolamine | 3.9 | 4.1 | 3.7 | 3.5 |
| Cymel 327 * | 91.9 | 91.9 | 91.9 | 91.9 |
| Aluminum paste *2 | 59.9 | 59.9 | 59.9 | 59.9 |
| Ethylene glycol monobutyl ether | 60.6 | 60.6 | 60.6 | 60.6 |
| Thickener *3 | 4.7 | 4.7 | 4.7 | 4.7 |
| Deionized water | 123.9 | 123.7 | 124.1 | 124.3 |
| Deionized water to adjust viscosity | 122.8 | 142.9 | 103.4 | 49.2 |
| Total | 1122.8 | 1142.9 | 1103.4 | 1049.2 |
| Paint solids | 28.5% | 28.0% | 29.0% | 30.5% |

*1 Trade name Mitsui Scitec
*2 Alupaste 0539X (trade name Toyo Aluminum)
*3 Primal ASE-60 (trade name Rohm & Haas)

TABLE 11

| | (parts by weight) | | |
|---|---|---|---|
| Embodiment No. | 9 | 10 | 11 |
| Aqueous dispersion | | | |
| A-1-1aq | 517.2 | 517.2 | — |
| A-1-2aq | — | — | — |
| A-1-3aq | — | — | — |
| A-1-4aq | — | — | — |
| A-2-1aq | — | — | 517.2 |
| A-2-2aq | — | — | — |
| A-2-3aq | — | — | — |
| A-2-4aq | — | — | — |
| Acrylic fine particles | | | |
| B-1 | — | — | — |
| B-2 | 137.9 | — | — |
| B-3 | — | 137.9 | — |
| B-4 | — | — | 137.9 |
| Dimethylethanolamine | 3.6 | 3.7 | 3.5 |
| Cymel 327 | 91.9 | 91.9 | 91.9 |
| Aluminum paste *2 | 59.9 | 59.9 | 59.9 |
| Ethylene glycol monobutyl ether | 60.6 | 60.6 | 60.6 |
| Thickener *3 | 4.7 | 4.7 | 4.7 |
| Deionized water | 124.2 | 124.1 | 124.3 |
| Deionized water to adjust viscosity | 66.7 | 142.9 | 122.8 |
| Total | 1066.7 | 1142.9 | 1122.8 |
| Paint solids | 30.0% | 28.0% | 28.5% |

*1 Trade name Mitsui Scitec
*2 Alupaste 0539X (trade name Toyo Aluminum)
*3 Primal ASE-60 (trade name Rohm & Haas)

TABLE 12

| Embodiment No. | 1 | 2 | 3 | 4 | 5 | 6 | 7 | 8 | 9 | 10 | 11 |
|---|---|---|---|---|---|---|---|---|---|---|---|
| Dry film thickness | | | | | | | | | | | |
| Undercoat (μm) | 15 | 16 | 15 | 15 | 16 | 15 | 15 | 16 | 15 | 15 | 15 |
| Clear coat (μm) | 40 | 40 | 41 | 41 | 41 | 40 | 41 | 40 | 41 | 40 | 41 |
| Painted appearance | | | | | | | | | | | |
| 60° Gloss | 93 | 93 | 95 | 94 | 93 | 95 | 94 | 94 | 95 | 93 | 95 |
| Smoothness | ○ | ○ | ○ | ○ | ○ | ○ | ○ | ○ | ○ | ○ | ○ |
| Sagging | ○ | ○ | ○ | ○ | ○ | ○ | ○ | ○ | ○ | ○ | ○ |
| Al bittiness | ○ | ○ | ○ | ○ | ○ | ○ | ○ | ○ | ○ | ○ | ○ |
| Paint film performance | | | | | | | | | | | |
| Water-resistance | ○ | ○ | ○ | ○ | ○ | ○ | ○ | ○ | ○ | ○ | ○ |
| Resilience | ○ | ○ | ○ | ○ | ○ | ○ | ○ | ○ | ○ | ○ | ○ |
| Resistance to chemicals | ○ | ○ | ○ | ○ | ○ | ○ | ○ | ○ | ○ | ○ | ○ |
| Storage stability | ○ | ○ | ○ | ○ | ○ | ○ | ○ | ○ | ○ | ○ | ○ |

Comparison Preparation Examples 1–4

1) Making an Acrylic Graft Copolymer

Acrylic graft copolymers E-1 to E-4 were made by the same method as in Preparation Example 1 according to the formulations in Table 13 and Table 14. In E-1 the acid values of the hydrophilic acrylic copolymer (component (a1-1)) which becomes the stabilizing layer and of the final product are too high; in E-2 the hydroxyl value of the hydrophilic acrylic copolymer (component (a1-1)) which becomes the stabilizing layer is too low; in E-3 the acid values of the hydrophobic acrylic copolymer (monomer combination (a2-1) which becomes the dispersion layer and of the final product are too high; and in E-4 the hydroxyl values of the hydrophobic acrylic copolymer (monomer combination (a2-

1) which becomes the dispersion layer and of the final product are too high.

TABLE 13

| Acrylic graft copolymer No. | E-1 | E-2 |
|---|---|---|
| Process 1 (parts by weight) | | |
| Solvent composition | | |
| Methyl isopropyl ketone | 95.5 | — |
| Toluene | — | 95.5 |
| Monomer composition | | |
| 2-Hydroxyethyl methacrylate | 34.8 | 3.5 |
| Acrylic acid | 28.9 | 19.4 |
| n-Butyl acrylate | 50.6 | 5O.3 |
| n-Butyl methacrylate | — | — |
| Methyl methacrylate | — | 76.8 |
| 2-Ethylhexyl methacrylate | 35.7 | — |
| Initiator | | |
| t-Butyl peroxybenzoate | 4.5 | 4.5 |
| Reaction temperature | reflux | reflux |
| Process 2 (parts by weight) | | |
| Solvent composition | | |
| Methyl isopropyl ketone | 286.6 | — |
| Toluene | — | 286.6 |
| Monomer composition | | |
| 2-Hydroxyethyl methacrylate | 104.4 | 104.4 |
| n-Butyl methacrylate | — | — |
| Acrylic acid | — | — |
| Methyl methacrylate | 214.5 | 214.5 |
| n-Butyl acrylate | 131.1 | 131.1 |
| Glycidyl methacrylate | 4.4 | 4.4 |
| Initiator | | |
| t-BPOEH *1 | 9.0 | 9.0 |
| Reaction temperature | reflux | reflux |
| Properties of component (al-1) obtained by Process 1 | | |
| Acid value (mg KOH/g) | 150 | 100 |
| Hydroxyl value (mg KOH/g) | 100 | 10 |
| Glass transition temperature (°C.) | 0 | +30 |
| Number average molecular weight | 4700 | 4800 |
| Properties of monomer combination (a2-1) polymerized in Process 2 | | |
| Acid value (mg KOH/g) | 0 | 0 |
| Hydroxyl value (mg KOH/g) | 100 | 100 |
| Glass transition temperature (°C.) | +30 | +30 |
| Properties of the acrylic graft copolymer | | |
| Acid value (mg KOH/g) | 34 | 22 |
| Hydroxyl value (mg KOH/g) | 100 | 78 |
| Glass transition temperature (°C.) | +22 | +30 |
| Number average molecular weight | 31000 | 31000 |
| Component (al-1)/component (mm-1) (w/w) | 25/75 | 25/75 |
| Component (m-3)/component (al-1) mol ratio | 1.0 | 1.0 |

*1 t-BPOEH : t-Butylperoxy-2-ethylhexanoate

TABLE 14

| Acrylic graft copolymer No. | E-3 | E-4 |
|---|---|---|
| Process 1 (parts by weight) | | |
| Solvent composition | | |
| Methyl isopropyl ketone | 95.5 | 95.5 |
| Toluene | — | — |
| Monomer composition | | |
| 2-Hydroxyethyl methacrylate | 34.8 | 34.8 |
| Acrylic acid | 19.4 | 19.4 |
| n-Butyl acrylate | 35.8 | 35.8 |
| n-Butyl methacrylate | — | — |
| Methyl methacrylate | — | — |
| 2-Ethylhexyl methacrylate | 60.0 | 60.0 |
| Initiator | | |
| t-Butyl peroxybenzoate | 4.5 | 4.5 |
| Reaction temperature | reflux | reflux |
| Process 2 (parts by weight) | | |
| Solvent composition | | |
| Methyl isopropyl ketone | 286.7 | 286.6 |
| Toluene | — | — |
| Monomer composition | | |
| 2-Hydroxyethyl methacrylate | 104.4 | 208.8 |
| n-Butyl methacrylate | — | — |
| Acrylic acid | 17.3 | — |
| Methyl methacrylate | 170.7 | 132.0 |
| n-Butyl acrylate | 157.5 | 109.2 |
| Glycidyl methacrylate | 4.4 | 4.4 |
| Initiator | | |
| t-BPOEH *1 | 9.0 | 9.0 |
| Reaction temperature | reflux | reflux |
| Properties of component (al-1) obtained by Process 1 | | |
| Acid value (mg KOH/g) | 100 | 100 |
| Hydroxyl value (mg KOH/g) | 100 | 100 |
| Glass transition temperature (° C.) | 0 | 0 |
| Number average molecular weight | 4700 | 4700 |
| Properties of monomer combination (a2-1) polymerized in Process 2 | | |
| Acid value (mg KOH/g) | 30 | 0 |
| Hydroxyl value (mg KOH/g) | 100 | 200 |
| Glass transition temperature (°C.) | +20 | +30 |
| Properties of the acrylic graft copolymer | | |
| Acid value (mg KOH/g) | 44 | 22 |
| Hydroxyl value (mg KOH/g) | 100 | 175 |
| Glass transition temperature (°C.) | +15 | +22 |
| Number average molecular weight | 31000 | 31000 |
| Component (al-1)/component (mm-1) (w/w) | 25/75 | 25/75 |
| Component (m-3)/component (al-1) mol ratio | 1.0 | 1.0 |

*1 t-BPOEH : t-Butylperoxy-2-ethylhexanoate

2) Making an aqueous suspension

Using the acrylic graft copolymers E-1 to E-4 obtained in 1) above, aqueous emulsions E-1aq to E-4aq of acrylic graft copolymers E-1 to E-4 were made by the same method as in Preparation Example 2-1 with the combinations shown in Table 15.

TABLE 15

| Aqueous dispersion No. | E-1aq | E-2aq | E-3aq | E-4aq |
|---|---|---|---|---|
| Type of acrylic graft copolymer | E-1 | E-2 | E-3 | E-4 |
| Graft copolymer included | 533.0 | 533.0 | 533.0 | 533.0 |
| Ethylene glycol monobutyl ether | 80.0 | 80.0 | — | 80.0 |
| Methyl isopropyl ketone distilled off under decreased pressure | 203.0 | — | 203.0 | — |
| Toluene distilled off under decreased pressure | — | 203.0 | — | 203.0 |
| Dimethylethanolamine | 8.6 | 5.6 | 11.1 | 5.6 |
| Deionized water | 581.4 | 584.4 | 578.9 | 584.4 |
| Nature of the aqueous dispersion obtained | milky white low-viscosity liquid | milky white low-viscosity liquid | milky white low-viscosity liquid | milky white low-viscosity liquid |

Note 1: Low-viscosity means ≦1 ps at 25° C.
Note 2: Units parts by weight

Comparison Preparation Examples 5 and 6
Making Internally Non-Crosslinked Acrylic Fine Particles Internally non-crosslinked acrylic fine particles were made by the same method as in Preparation Example 5, according to the formulations of Table 16. In the case of internally non-crosslinked acrylic fine particles F-1 the acid value was too low, and in F-2 the hydroxyl value was too high.

TABLE 16

| Acrylic fine particle No. | F-1 | F-2 |
|---|---|---|
| Put into the reaction tank | | |
| Deionized water | 606 | 606 |
| Ereminol ES-12 *1 | 3 | 3 |
| Mixture (1) | | |
| n-Butyl acrylate | 47.8 | 16.8 |
| Methyl methacrylate | 71.6 | 40.0 |
| 2-Hydroxyethyl acrylate | 30.6 | 93.2 |
| Ereminol ES-12 *1 | 0.6 | 0.6 |
| Deionized water | 100 | 100 |
| Polymerization initiator (1) | | |
| Ammonium persulphate | 0.6 | 0.6 |
| Deionized water | 19.4 | 19.4 |
| Mixture (2) | | |
| n-Butyl acrylate | 37.7 | 10 |
| 2-Hydroxyethyl acrylate | 10.8 | 30.8 |
| Methacrylic acid | 1.5 | 9.2 |
| Ereminol ES-12 *1 | 0.4 | 0.4 |
| Deionized water | 50 | 50 |
| Polymerization initiator (2) | | |
| Ammonium sulfate | 0.2 | 0.2 |
| Deionized water | 19.8 | 19.8 |
| Properties of the internally non-crosslinked acrylic fine particles (B) | | |
| Acid value (mg KOH/g) | 5 | 30 |
| Hydroxyl value (mg KOH/g) | 100 | 300 |
| Glass transition temperature (°C.) | -4 | 2 |
| Mean particle size (nm) | 60 | 70 |

*1 Trade name Sanyo Chemicals

Comparison Examples 1–6

Water-based paint compositions were prepared as in the embodiments based on the combinations in Table 17 and Table 18. The water-based paint compositions obtained were evaluated by the same methods as for the embodiments. The results are shown in Table 19.

TABLE 17

| | (parts by weight) | | |
|---|---|---|---|
| Comparison Example No. | 1 | 2 | 3 |
| Aqueous dispersion | | | |
| E-1aq | 517.2 | — | — |
| E-2aq | — | 517.2 | — |
| E-3aq | — | — | 517.2 |
| E-4aq | — | — | — |
| A-1-1aq | — | — | — |
| Acrylic fine particles | | | |
| B-1 | 137.9 | 137.9 | 137.9 |
| F-1 | — | — | — |
| F-2 | — | — | — |
| Dimethylethanolamine | 4.9 | 3.5 | 5.2 |
| Cymel 327 *1 | 91.9 | 91.9 | 91.9 |
| Aluminum paste *2 | 59.9 | 59.9 | 59.9 |
| Ethylene glycol monobutyl ether | 60.6 | 60.6 | 60.6 |
| Thickener *3 | 4.7 | 4.7 | 4.7 |
| Deionized water | 122.9 | 124.3 | 122.6 |
| Deionized water to adjust viscosity | 454.5 | 0.0 | 561.0 |
| Total | 1454.5 | 1000.0 | 1561.0 |
| Paint solids | 22.0% | 32.0% | 20.5% |

*1 Trade name Mitsui Scitec
*2 Alupaste 0539X (trade name Toyo Aluminum)
*3 Primal ASE-60 (trade name Rohm & Haas)

TABLE 18

| | (parts by weight) | | |
|---|---|---|---|
| Comparison Example No. | 4 | 5 | 6 |
| Aqueous dispersion | | | |
| E-1aq | — | — | — |
| E-2aq | — | — | — |
| E-3aq | — | — | — |
| E-4aq | 517.2 | — | — |
| A-1-1aq | — | 517.2 | 517.2 |
| Acrylic fine particles | | | |
| B-1 | 137.9 | — | — |
| F-1 | — | 137.9 | — |
| F-2 | — | — | 137.9 |
| Dimethylethanolamine | 3.5 | 3.2 | 3.3 |
| Cymel 327 | 91.9 | 91.9 | 91.9 |
| Aluminum paste *2 | 59.9 | 59.9 | 59.9 |
| Ethylene glycol monobutyl ether | 60.6 | 60.6 | 60.6 |
| Thickener *3 | 4.7 | 4.7 | 4.7 |
| Deionized water | 124.3 | 124.6 | 124.5 |

TABLE 18-continued

| | (parts by weight) | | |
|---|---|---|---|
| Comparison Example No. | 4 | 5 | 6 |
| Deionized water to adjust viscosity | 142.9 | 0.0 | 66.7 |
| Total | 1142.9 | 1000.0 | 1066.7 |
| Paint solids | 28.0% | 32.0% | 30.0% |

*1 Trade name Mitsui Scitec
*2 Alupaste 0539X (trade name Toyo Aluminum)
*3 Primal ASE-60 (trade name Rohm & Haas)

TABLE 19

| Embodiment No. | 1 | 2 | 3 | 4 | 5 | 6 |
|---|---|---|---|---|---|---|
| Dry film thickness | | | | | | |
| Undercoat (μm) | 15 | 16 | 15 | 1S | 16 | 15 |
| Clear coat (μm) | 40 | 40 | 41 | 41 | 41 | 40 |
| Painted appearance | | | | | | |
| 60° Gloss | 90 | 91 | 90 | 92 | 89 | 93 |
| Smoothness | o | o | o | o | o | o |
| Sagging | x | o | x | o | o | o |
| Al bittiness | o | o | o | o | x | o |
| Paint film performance | | | | | | |
| Water-resistance | o | o | x | x | o | x |
| Resistance to chemicals | o | x | o | o | o | o |
| Storage stability | o | o | o | o | o | o |

It is evident from the results of Table 19 that with Comparison Example 1 the proportion of painted solids of the resulting water-based paint composition is low so that sagging is produced and paint film appearance is inferior because the acid value of the acrylic graft copolymer E-1 is too high and the acid value of the stabilizing layer constituent of graft copolymer E-1 is too high.

With Comparison Example 2 the resistance of the resulting paint film to chemicals is inferior because the hydroxyl value of the stabilizing layer constituent of the acrylic graft copolymer E-2 is too low.

With Comparison Example 3 the proportion of painted solids of the resulting water-based paint composition is low so that sagging is produced and paint film appearance is inferior because the acid value of the acrylic graft copolymer E-3 is too high and the acid value of the dispersion layer constituent of graft copolymer E-3 is too high.

With Comparison Example 4 the water-resistance of the resulting paint film is inferior because the hydroxyl value of the acrylic graft copolymer E-4 is too high and the hydroxyl value of the dispersion layer constituent of the acrylic graft copolymer E-4 is too high.

With Comparison Example 5 the pseudoplastic properties of the resulting water-based paint composition are weak, so that aluminum bittiness is produced in the resulting paint film and appearance is inferior, because the acid value of the acrylic fine particles F-1 is low.

With Comparison Example 6 the resulting paint film is inferior in water-resistance because the hydroxyl value of the acrylic fine particles F-2 is high.

We claim:

1. A water-based paint composition comprising (A) a water-dispersible acrylic graft copolymer having an acid value of from 10 to 28 mg KOH/g and a hydroxyl value of 50–150 mg KOH/g, wherein (A) is a graft copolymer of (a1) an acrylic copolymer of α,β-ethylenic unsaturated monomers including an α,β-ethylenic unsaturated carboxylic acid, said copolymer having an acid value of 35–120 mg KOH/g and a hydroxyl value of 50–150 mg KOH/g, and (a2) an acrylic copolymer of α,β-ethylenic unsaturated monomers, said copolymer having an acid value of ≦15 mg KOH/g and a hydroxyl value of 50–150 mg KOH/g, wherein (a1) and (a2) are graft copolymerized via chemical linkages, and (B) internally non-crosslinked acrylic fine particles comprising a copolymer different from the water-dispersible acrylic graft copolymer (A) and made by emulsion polymerization of α,β-ethylenic unsaturated monomers (b1), said copolymer having an acid value of 30–200 mg KOH/g and a hydroxyl value of 15–200 mg KOH/g, wherein the water-dispersible acrylic graft copolymer (A), is present in an amount between 10 and 90% by weight, and the internally non-crosslinked acrylic fine particles (B) are present in an amount between 10 and 90% by weight, based on total resin solids in the water-based paint composition.

2. A water-based paint composition according to claim 1, further comprising an amino resin (C) of a number-average molecular weight of ≦1000, present in an amount of 10–40% by weight, based on the weight of the total resin solids in the water-based paint composition.

3. A water-based paint composition according to claims 1 or 2, further comprising (D) an organic thickener swelled by alkalis in an amount of 0.1–5 % by weight based on the weight of the total resin solids in the water-based paint composition.

4. A water-based paint composition according to one of claims 1–3, wherein the glass transition temperature of the acrylic copolymer (a1) is −20 to +50° C. and its number average molecular weight is 4500–9000, the glass transition temperature of the water-dispersible acrylic graft copolymer (A) is −20 to +50° C. and its number average molecular weight is 10,000 to 100,000, and the mean particle size of the internally non-crosslinked acrylic fine particles (B) in an aqueous medium is 20–150 nm.

* * * * *